(12) United States Patent
Tran Van et al.

(10) Patent No.: US 10,256,761 B2
(45) Date of Patent: Apr. 9, 2019

(54) MONITORING HEALTH OF ELECTRICAL EQUIPMENT

(71) Applicant: INTEL CORPORATION, Santa Clara, CA (US)

(72) Inventors: Hoang Tran Van, Phoenix, AZ (US); Siew Wen Chin, Pulau Pinang (MY); Fatema S. Adenwala, Hillsboro, OR (US); Ravindra V. Narkhede, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/253,041

(22) Filed: Aug. 31, 2016

(65) Prior Publication Data
US 2018/0062553 A1 Mar. 1, 2018

(51) Int. Cl.
*H02P 23/14* (2006.01)
*H02P 29/024* (2016.01)

(52) U.S. Cl.
CPC ............ *H02P 23/14* (2013.01); *H02P 29/024* (2013.01)

(58) Field of Classification Search
CPC ........ H02P 23/14; G01R 11/00; G01R 13/00; G01R 15/00; G01R 17/00; G01R 19/02; G01R 29/04; G01B 7/00; G06F 11/00; G06F 17/00
See application file for complete search history.

(56) References Cited

U.S. PATENT DOCUMENTS

| 6,172,509 | B1 | 1/2001 | Cash et al. |
| 2002/0032535 | A1* | 3/2002 | Alexander ........... G01R 21/133 702/64 |
| 2004/0230384 | A1* | 11/2004 | Haynes ................... F04B 17/03 702/57 |
| 2005/0237212 | A1 | 10/2005 | Gustafson et al. |
| 2011/0224957 | A1* | 9/2011 | Ransom ............ H02M 7/53873 703/2 |
| 2011/0257934 | A1 | 10/2011 | Domino et al. |
| 2014/0074413 | A1 | 3/2014 | Som et al. |
| 2016/0274191 | A1* | 9/2016 | Gerdes ................... B60L 3/0061 |
| 2016/0349293 | A1* | 12/2016 | Chattopadhyay ...... G01R 21/00 |

FOREIGN PATENT DOCUMENTS

WO 2015041789 A1 3/2015

OTHER PUBLICATIONS

PCT International Search Report, PCT No. PCT/US2017/045138, dated Nov. 8, 2017, 3 pages.

* cited by examiner

*Primary Examiner* — Eduardo Colon Santana
*Assistant Examiner* — Said Bouziane
(74) *Attorney, Agent, or Firm* — International IP Law Group, P.L.L.C.

(57) ABSTRACT

Techniques for monitoring the health of a device comprising a motor or generator are described. An apparatus to monitor the health of the device includes a plurality of sensors to detect root-mean-square (RMS) current values for a plurality of stator windings of the device. The apparatus also includes a processor to receive the RMS current values from the plurality of sensors and compute a fault indicator based on the RMS current values. The fault indicator represents a level of current imbalance between the plurality of stator windings due to winding faults.

19 Claims, 8 Drawing Sheets

200

500

MONITORING HEALTH OF ELECTRICAL EQUIPMENT

TECHNICAL FIELD

The present techniques relate generally to Internet of Things (IoT) devices. More specifically the present techniques relate to devices that can monitor a network of Alternating Current (AC) motors/generators, such as synchronous motors/generators, asynchronous motors/generators, and other types of AC motors/generators.

BACKGROUND

It has been estimated that the Internet of Things (IoT) may bring Internet connectivity to 50 billion devices by 2020. For organizations, IoT devices may provide opportunities for monitoring and tracking other devices and items, including devices in industrial implementations. For example, IoT devices may be used to monitor the health and function of motors in an industrial setting.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
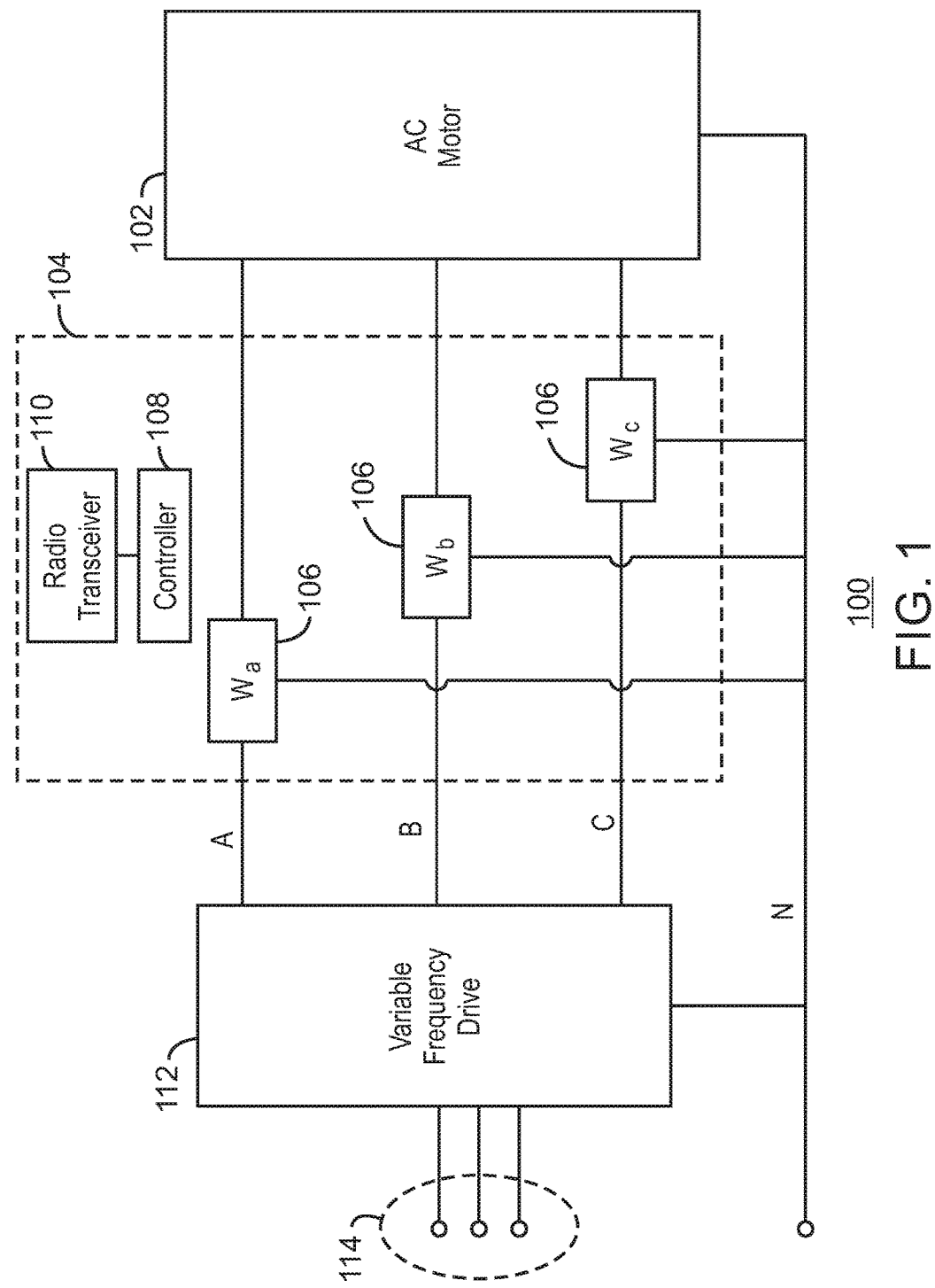
FIG. 1 is a block diagram of an example monitoring device for an AC motor.

The internet of things (IoT) is a concept in which a large number of computing devices are interconnected to each other and to the Internet to provide functionality and data acquisition at very low levels. For example, IoT networks may include commercial and home automation devices, such as water distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. In one example, IoT devices may be used to monitor the health of electrical equipment such as a team of motors and/or generators in an industrial setting.

Various techniques exist for the online health monitoring of critical equipment. Such techniques may be designed to detect specific faults of a machine. For example, monitoring is useful to detect early faults in AC motors and generators, such as short winding faults, which can occur when two or more windings become electrically shorted or two or more turns of the same winding become electrically shorted. Such faults tend to develop slowly over time, leading to a gradual degradation of the motor's performance and eventual failure. Early detection of such faults can enable maintenance operations to be performed before the level of degradation causes failure of the device.

Existing techniques such as Motor Current Signature Analysis (MCSA) and Park's Phase Plot require high sampling rate at the sensor level to capture high frequency contents of the signal characteristics to detect subtle changes in the current signature and profile (main frequency and harmonics). As an example, each electrical signal cycle of a 50-Hz AC motor lasts only 1/50 seconds (0.02 s). In order to extract features in the 50 Hz signal for fault classification and detection purposes, the data sampling rate has to be performed at several times the supply AC signal (2-3 kHz for example). This is because the differences in profile between the healthy and faulty winding is compared within a single electrical cycle and that comparison has to be performed on a cycle-to-cycle basis that lasts 0.02 seconds. As a result, existing techniques rely on expensive sensors, complex instrumentations, complex calculations, and extensive CPU power to accomplish the intended functions. Therefore, such techniques are not well suited for use in an IoT monitoring network.

By contrast, the techniques disclosed herein provide an effective and simpler solution to detect winding faults at an early stage of fault development. When winding shorts occur, the variations in the electrical characteristics of each winding (impedance) lead to imbalances in the three-phase currents on the windings. As the winding characteristics change under steady-state operation, the peak values of the instantaneous three-phase currents are sensed or derived using the RMS currents and compared to one other to detect changes in current balance. These changes in current balance are processed to provide an indication of changes in the health of the device. The monitoring of the peak current in each winding can be accomplished through the use of its RMS current. In this instance, a low sampling rate would be adequate. This reduces the processing requirements and overall complexity of the monitoring device to a level that can be implemented in a small, inexpensive IoT device.

The disclosed techniques also provide a more readily recognizable indication of early winding fault stages. Park's method uses a phase plot characteristic performed between the direct and quadrature currents to detect faults. In Park's method, the direct and quadrature currents are derived from the instantaneous currents. The phase plot between the direct and quadrature currents shows a perfect circle if the system is healthy. However, this circle will gradually change into an ellipse as the fault slowly increases. When the winding fault is at an early stage, the distinction between a circle and an ellipse is difficult to discern. By the time an ellipse is identified, the fault has already progressed beyond the early stages, which makes Park's method unsuitable for low-level fault detection.

The techniques disclosed herein provide a circular health Indicator, wherein the size of the circle (radius or diameter) indicates the level of current imbalance in the windings, hence the change in winding impedance. This enables early detection of faults resulting, for example, for current imbalances of less than 1%.

The techniques described herein enable the implementation of an IoT monitoring network for monitoring the health of a plurality of motors and/or generators throughout a facility such as a manufacturing plant, a power generation plant, and others. Inexpensive IoT devices may be deployed throughout a facility, with each IoT device determining the health of an individual motor and/or generator and reporting its findings to a central monitoring station. Monitoring the equipment health and obtaining early fault indications enables facility stakeholders to better understand the health of the facility and plan maintenance tasks to avoid downtime. The networking of these IoT devices is described further in relation to FIGS. 5A and 5B.

FIG. 1 is a block diagram of an example monitoring device for an AC motor. The AC motor 102 may be any type of AC motor, including synchronous and asynchronous motors. The AC motor 102 may be deployed in a manufacturing facility, an automobile, or any other suitable application. Although a motor is used as an example device for explaining features of the present techniques, it will be appreciated that the disclosed techniques are equally applicable to generators.

The AC motor 102 is coupled to a source of three-phase AC electrical power. The three phases are labeled in FIG. 1, as phase A, phase B, and phase C. In the example shown in FIG. 1, the AC motor 102 is also coupled to a neutral terminal, labeled N. The speed of the AC motor 102 can be controlled by altering the line frequency of the current source driving the AC motor 102. For example, in synchronous motors, the rotor rotates in synchronism with the line frequency. In asynchronous motors, often referred to as induction motors, the operating speed of the motor is slightly lower than synchronous speed. In either case, the speed of the AC motor 102 may be controlled through the use of a variable frequency drive (VFD) 112. The VFD 112 receives three phase AC power input 114 from a power source such as a generator or an electrical grid and delivers power to the motor input at a specified frequency and amplitude for driving the AC motor 102 at a desired speed.

The monitoring device, referred to herein as the health monitor 104 includes three sensors 106, labeled Wa, Wb, and Wc, a device controller 108, and a radio transceiver 110. Each sensor 106 monitors the RMS current present on one of the three motor input phases. The RMS data collected by the sensors 106 is sent to the controller 108 for processing to determine the health condition of the AC motor 102. The data generated by the controller 108 regarding the health of the motor may be referred to herein as motor state data. The motor state data may include a fault indicator, an identifier that uniquely identifies the motor 102, motor temperature measured by a temperature sensor (not shown), and other data such as the measured RMS current and peak current for each of the windings.

The motor state data generated by the controller 108 may be uploaded wirelessly to a monitoring station through a radio transceiver 110. In some examples, the health monitor 104 is an IoT device, which is networked with other health monitors to form a fog device. The networking of IoT health monitors to form a fog device is described further in relation to FIGS. 5A and 5B. The health monitor 104 may be a stand alone device or may be included as a component of a motor drive such as a VFD or as a component of the motor 102 itself.

To generate the fault indicator, the RMS current received from each sensor 106 is processed to compute a peak current for each motor winding from its corresponding RMS current. The fault indicator is then computed based on a comparison of the peak current values. The resulting fault indicator will be proportional to the level of imbalance in the three peak current values. The computation of the fault indicator is described further below, in relation to FIGS. 2 and 3.

The sampling of the RMS current and computation of the resulting fault indicator may be performed on a periodic basis. According to the present techniques, there is no need to obtain several data samples for each period of the current waveform driving the motor. Thus, the sampling of the RMS current may be performed at lower rate than the frequency of the AC current driving the motor. For example, the sampling of RMS current may be performed once every second or every few seconds. The sampling of the RMS current and computation of the resulting fault indicator may also be performed in response to a user query.

The block diagram of FIG. 1 is a simplified representation of an actual monitoring device that may be implemented in accordance with the present techniques. A more detailed example of a health monitor 104 is described in relation to FIG. 6.

Figure 2:
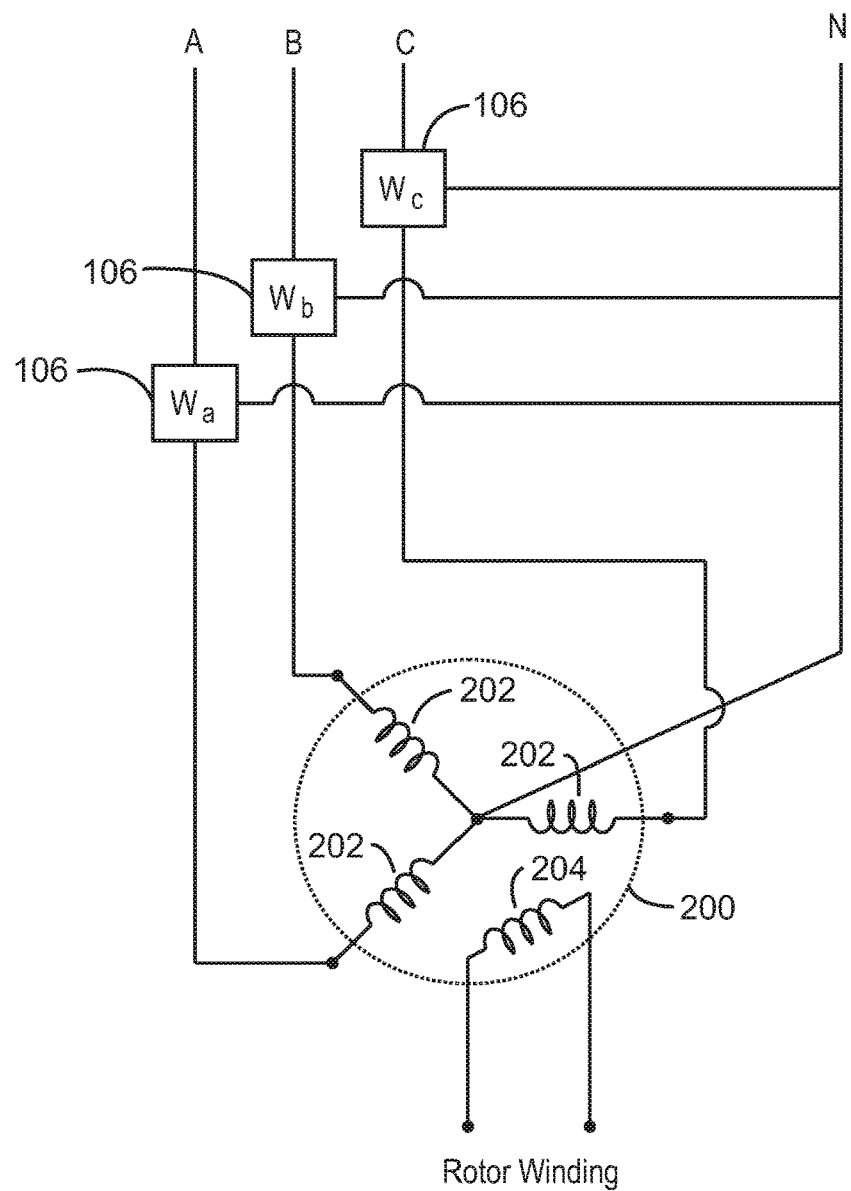
FIG. 2 is a block diagram of an example AC motor with a health monitor.

FIG. 2 is a block diagram of an example AC motor with a health monitor. The motor 200 shown in FIG. 2 is an example of a synchronous motor. However, the present techniques will also apply to other types of AC motors. The synchronous motor 200 includes three stator windings 202 arranged in a three-phase, four-wire wye configuration with the neutral phase coupled to the junction. Although a wye configuration is shown, the Delta configuration is also possible. The synchronous motor also includes a rotor winding 204, which may be coupled to a separate AC or DC current source as shown in FIG. 2. Each RMS sensors is coupled in series with a separate one of the stator windings to measure the RMS power on each stator winding. The currents on each of the stator windings during steady state operation of the motor are described further in relation to FIG. 3.

Figure 3:
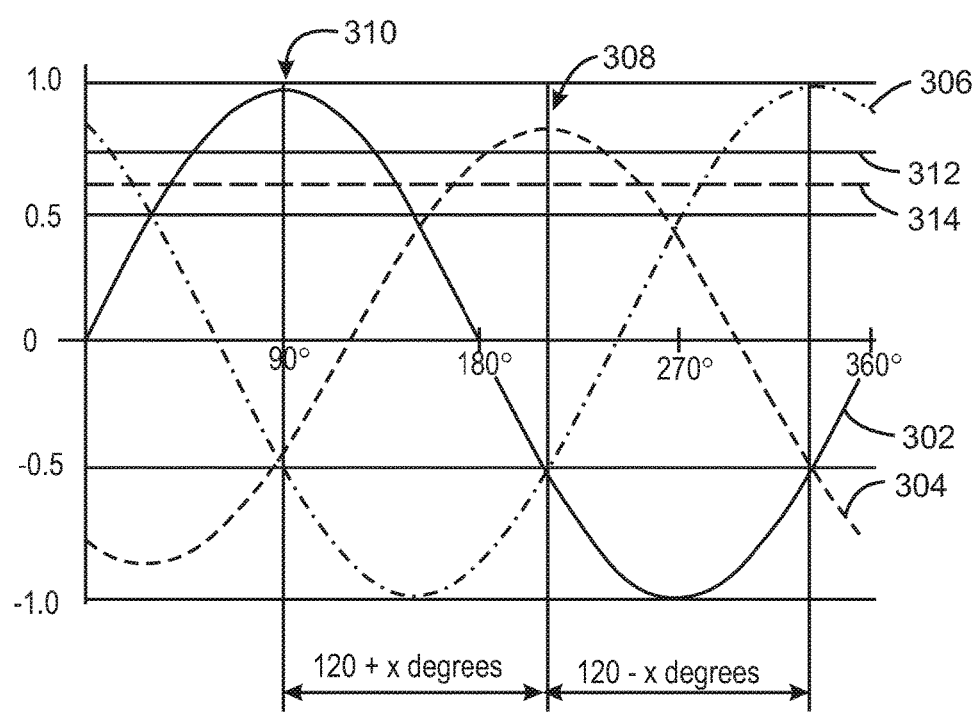
FIG. 3 is a graph showing an example of the winding currents for a synchronous motor.

FIG. 3 is a graph showing an example of the winding currents for a synchronous motor. The current in winding A is shown with the solid line 302, the current in winding B is shown with the dashed line 304, and the current in winding C is shown with the dash-dot line 306.

In an ideal motor with no winding faults, the impedance of each stator winding will be equal and the peak currents in each stator winding will also be equal. Additionally, the phase angle between each current waveform will be 120 degrees. When there is a fault in the winding as shown in FIG. 3, the peak current 308 in stator winding B is lower than the peak current 310 in stator winding A. This peak current imbalance is indicative of a winding fault.

The sensing of the RMS currents in each stator winding provides a measure of the peak currents. The RMS current in each stator winding is related to the peak current by the followings equations.

$$I1_{Peak} = \sqrt{2} * I1\,rms \qquad (eq.\ 1)$$

$$I2_{Peak} = \sqrt{2} * I2\,rms \qquad (eq.\ 2)$$

$$I3_{Peak} = \sqrt{2} * I3\,rms \qquad (eq.\ 3)$$

In the above equations, I1 rms, I2 rms, and I3 rms are the root-mean-square of the instantaneous line currents. In the graph 300, the RMS current in stator winding A is shown with the solid line 312, and the RMS current in stator winding B is shown with the dashed line 314. For simplicity, the RMS current in stator winding C is not shown. However, it will be appreciated that the motor health indication may be calculated based on sensing the RMS current in all of the stator windings.

As the winding degrades, its impedance reduces and causes the three-phase peak currents as well as its relative phase angles between them to be changed. The 120 degrees phase shift between the three winding currents is no longer maintained and a set of three new phase angles will develop to accommodate for the difference in current amplitudes. Peak currents are readily available through the data collection of RMS currents (eq. 1-3). However, the phase angles between the three winding currents are not readily available without sampling the currents at a high sampling rate, i.e., several samples per cycle. The present technique avoids the need for a high sampling rate by referencing a phase angle of 120 degrees to the actual unmeasured phase angles of the faulty winding. This can be made through the use of a fault indicator, R, that may be computed using the formulas below.

$$R = \sqrt{Id^2 + Iq^2} \quad \text{(eq. 4)}$$

In equation 4, Id is the modified direct current at a particular instant of time, t. The term "modified" is used to indicate that a phase angle of 120 degrees is used in place of the actual unmeasured phase angles. The modified direct current can be computed using the following formulas.

$$I'1 = I1_{Peak} * \text{Sin}(\Omega * t) \quad \text{(eq. 5)}$$

$$I'2 = I2_{Peak} * \text{Sin}\left(\Omega * t - \frac{2\pi}{3}\right) \quad \text{(eq. 6)}$$

$$I'3 = I2_{Peak} * \text{Sin}\left(\Omega * t + \frac{2\pi}{3}\right) \quad \text{(eq. 7)}$$

$$Id = I'1 + I'2 + I'3 \quad \text{(eq. 8)}$$

In equation 4, Iq is the modified quadrature current at the same instant of time, t, and can be computed using the following formulas.

$$I''1 = I1_{Peak} * \text{Cos}(\Omega * t) \quad \text{(eq. 9)}$$

$$I''2 = I2_{Peak} * \text{Cos}\left(\Omega * t - \frac{2\pi}{3}\right) \quad \text{(eq. 10)}$$

$$I''3 = I3_{Peak} * \text{Cos}\left(\Omega * t + \frac{2\pi}{3}\right) \quad \text{(eq. 11)}$$

$$Iq = I''1 + I''2 + I''3 \quad \text{(eq. 12)}$$

In the above equations, $\Omega$ is the frequency of the electrical supply expressed in radians per second ($2\pi f$). According to Kirchhoff's law, the sum of the three instantaneous currents will be zero. Thus, if the actual phase angles existing between the current waveforms were to be inserted into equations 5, 6, and 7, the sum of these currents should equal zero. However, by referencing a phase angle of 120 degrees, equation 8 will yield a non-zero value to the extent that the actual phase angles differ from 120 degrees. The same holds true for Iq computed according to equations 9-12. Accordingly, the magnitude of the fault indicator, R, will be proportional to the degree to which the actual phase angles differ from 120 degrees and the peak currents.

The fault radius, R, will be constant for a given fault level. If Id is plotted against Iq during an electrical cycle, a perfect circle with a radius, R, is obtained. Therefore, the above equations for Id and Iq can be simplified to the following form by arbitrarily selecting t=0. This operation yields to the following Id and Iq.

$$Id = \sqrt{\frac{3}{4}} \, I3peak - \sqrt{\frac{3}{4}} \, I2peak \quad \text{(eq. 13)}$$

$$Iq = I1peak - \sqrt{\frac{1}{4}} \, I2peak - \sqrt{\frac{1}{4}} \, I3peak \quad \text{(eq. 14)}$$

As shown in equations 13 and 14, the fault indicator can be generated based on a comparison of the peak currents in the stator windings thru the fault indicator, $R = \sqrt{Id^2 + Iq^2}$. As shown in equation 4, the fault indicator, R, may be computed as the square root of the sum of the modified direct current squared and the modified quadrature current squared.

Figure 4:
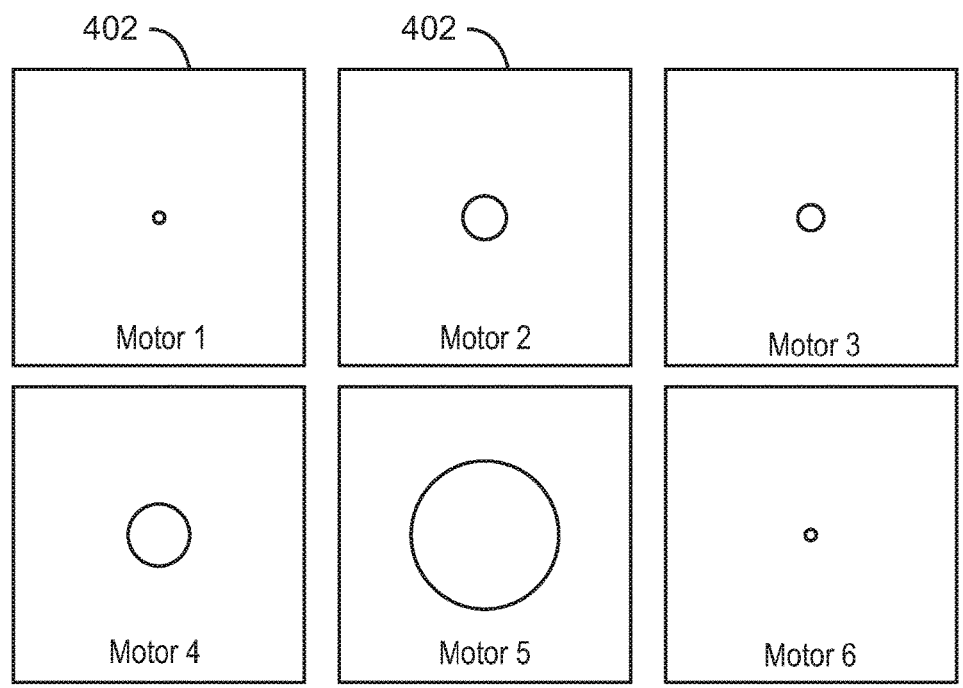
FIG. 4 is a representation of a graphical display that may be generated to represent of the health of one or more motors.

FIG. 4 is a representation of a graphical display that may be generated to represent of the health of one or more motors. The display shown in FIG. 4 may be rendered on a display screen at a monitoring station for example. The example graphical display of FIG. 4 includes six panels 402, one for each motor being monitored. In an actual implementation, the graphical display 400 may include more or fewer panels 402 depending, in part, on the number of motors being monitored.

Each display panel 402 includes a circle whose radius corresponds to the fault indicator, R. When used in this way, the fault indicator may be referred to as the fault indicator radius. Larger circles indicate a greater value of the fault indicator, and a perfect motor with no faults would be represented as a single point. Each panel may also display additional information, such as the unique identifier applicable to each corresponding motor.

The panels labeled MOTOR 1 and MOTOR 6 show a very small circle, which indicates that the motors have a very low level of winding faults, perhaps on the order of 0 to 1 percent fault condition. By contrast, the panel labeled MOTOR 5 shows a relatively large circle, which indicates that the motor have a very high level of winding faults, perhaps on the order of 30 to 50 percent fault condition. This may indicates that the motor health is compromised and should be replaced or repaired.

The panels labeled MOTOR 2, MOTOR 3, and MOTOR 4 show small circles, which are representative of a low level of winding faults, perhaps on the order of 5 to 10 percent fault condition. Such a low fault level may be indicative of a motor that is operating within acceptable boundaries but may need to be replaced or repaired in the near future. It can be seen that the graphical representation disclosed herein provides the ability to detect low level fault conditions. This in turn enables an operator to better plan future maintenance operations and avoid downtime. To further reduce the computation, instead of calculating and plotting the circle trajectory, the radius value of the circle may be plotted with time. This will allow a direct monitoring of the growth of a fault on the time scale chart.

Figure 5A:
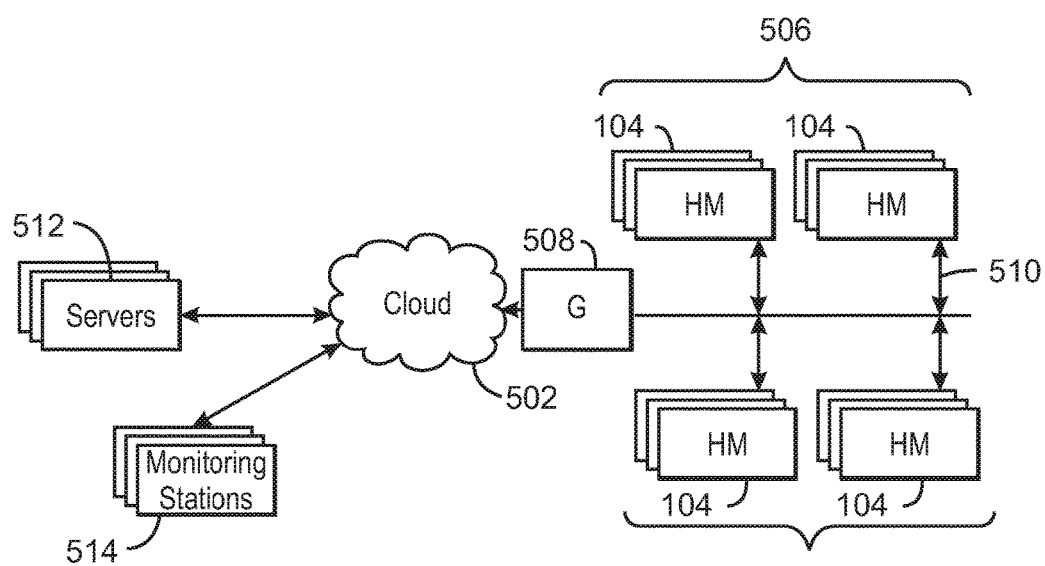
FIG. 5A is a drawing of a computing network including a computing cloud that may be used to monitor a plurality of motors.

FIG. 5A is a drawing of a computing network 500 including a computing cloud 502 that may be used to monitor a plurality of motors, generators, and other types of electrical equipment. The cloud 502 may include a local area network (LAN), a wide area network (WAN), or the Internet.

The motors, generators, and other equipment may be monitored by health monitors 104, which may be clustered into a group 506. The health monitors 104 may communicate with a gateway 508 over a network 510, which may be provided by radio communications, a wired network, or any combinations. For example, a network 510 may be used to communicate with health monitors 104 in a particular facility or area, while another network, such as a satellite uplink, a low power wide area network (LPWAN), an LTE network, and the like, may be used for communications between the gateway 508 and the cloud 502.

The health monitors 104 may be communicating through the cloud 502 with a server 512. For example, the health monitors 104 may send motor state data to the server 512 for storage and possibly further processing and analysis. The health monitors 104 may also be communicating through the cloud 502 with a monitoring station 514. The monitoring station 514 can gather the motor state data from all or a subset of the health monitors 104 and render a graphical display of the motor state data, as described for example in relation to FIG. 4.

The computing network 500 does not have to be a linear communications network, but may include a mesh network or fog of devices. This is described further with respect to FIG. 5B.

Figure 5B:
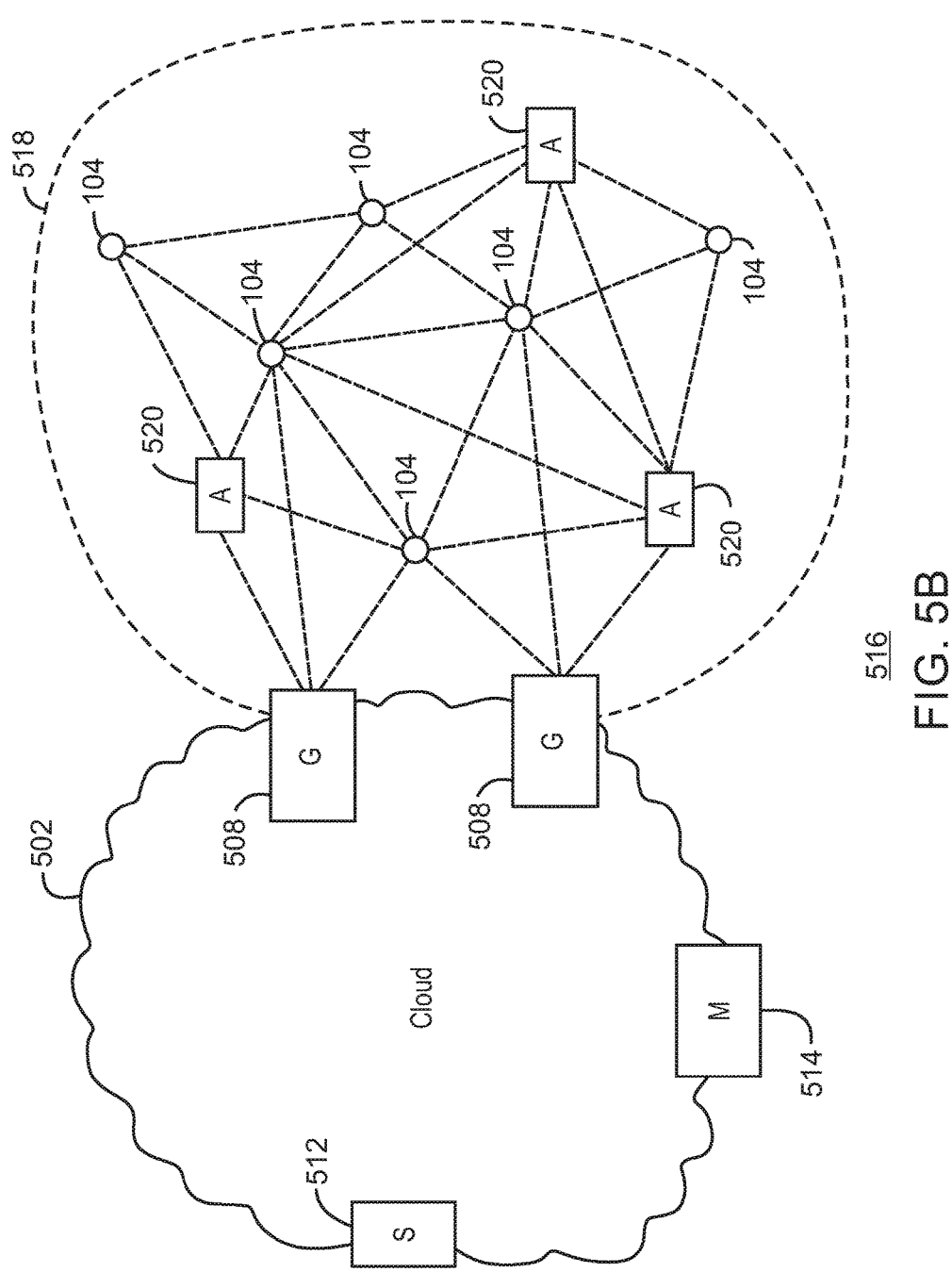
FIG. 5B is a drawing of a computing network including a computing cloud in communication with a mesh network of IoT devices, which may be termed a fog 508, operating at the edge of the cloud.

FIG. 5B is a drawing of a computing network 516 including a computing cloud 502, in communication with a mesh network of IoT devices, which may be termed a fog 518, operating at the edge of the cloud 502. The fog 518 may be considered to be a massively interconnected network wherein a number of IoT devices are in communications with each other and with the gateways 508, for example, by radio links (shown as dashed lines). The radio communications may be implemented by radios compliant with the IEEE 802.22 standard for wireless regional networks, compliant with the IEEE 802.15.4 standard for low power wide area networks, and the like.

The communications may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, MQTT, CoAP, and the like.

The fog 518 may include any number of different IoT devices. For example, three types of IoT devices are shown in the fog 518 of FIG. 5B, gateways 508, health monitors 104, and data aggregators 520. However, any combinations of IoT devices and functionality may be used. The data aggregators 520 may be included to collect and process data from the health monitors 104, providing local computing support and data storage in the fog 518. In some examples, the data aggregators 520 may have a display screen for rendering some or all of the motor state data collected from the health monitors 104. In some examples, the data aggregators 520 may be omitted, and the health monitors 104 handle all of the functions in the fog 518. In this example, the rendering of motor state data may be handled by the server 512 or in other systems in the cloud 502 such as the monitoring station 514.

The gateways 508 are the edge devices that provide communications between the cloud 502 and the fog 518. The fog 518 of IoT devices may be presented to devices in the cloud 502, such as a server 512 or monitoring station 514, as a single device located at the edge of the cloud 502, for example, as a fog 518 device. In this example, the motor state data coming from the fog 518 device may be sent without being identified as coming from a specific IoT device within the fog 518. For example, a packet header for a data packet containing motor state data might not contain an address that identifies the specific IoT device from which the data originates. This information may be presented as motor identification information within the body of the data packet.

In some examples, the IoT devices may be configured using an imperative programming style, for example, with each IoT device having a specific function. However, the IoT devices forming the fog 518 device may be configured in a declarative programming style, allowing the IoT devices to reconfigure their operations and communications to determine the resources needed to respond to conditions, queries, and device failures. For example, a query from a user located at a server 512 or the monitoring station 514 about the health of a particular motor may result in the fog 518 device selecting the IoT devices, such as the gateways 508, data aggregators 520, or health monitors 104, needed to answer the query.

Figure 6:
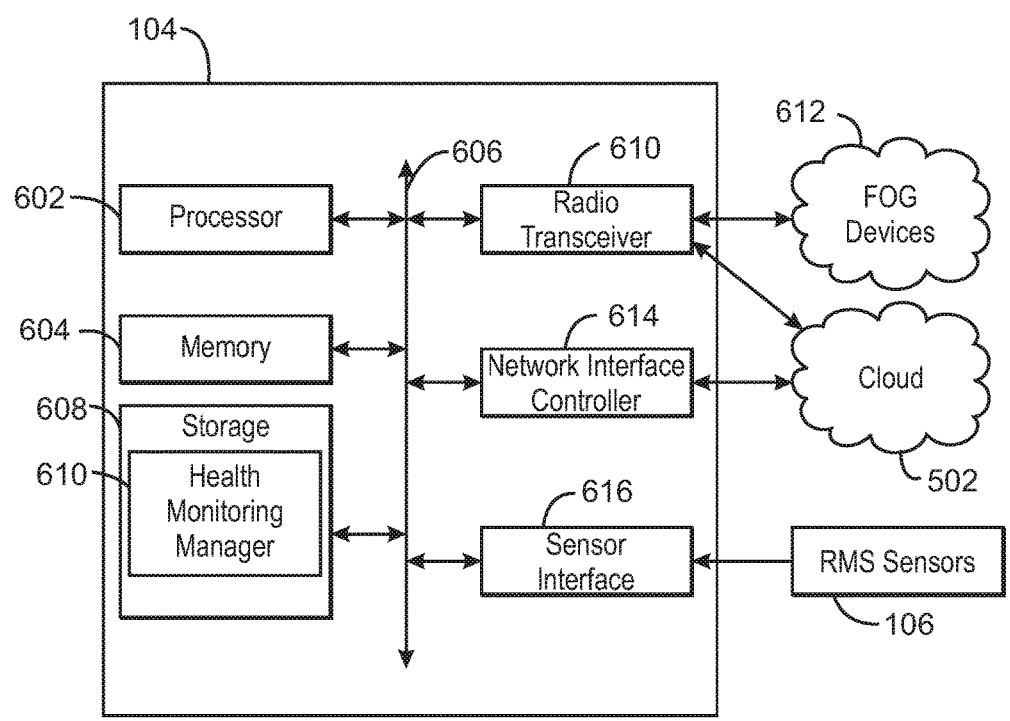
FIG. 6 is a block diagram of an example of components that may be present in a system 600 for monitoring a plurality of AC motors.

FIG. 6 is a block diagram of an example of components that may be present in a system 600 for monitoring a plurality of AC motors. The system 600 may include any combinations of the components shown in the example, and may be a separate health monitor or may be part of a fog device. The components may be implemented as ICs, portions thereof, discrete electronic devices, or other modules, logic, hardware, software, firmware, or a combination thereof adapted in the system, or as components otherwise incorporated within a chassis of a larger system. The block diagram of FIG. 6 is intended to show a high level view of components of the system 600. However, some of the components shown may be omitted, additional components may be present, and different arrangement of the components shown may occur in other implementations.

The system 600 may include a processor 602, which may be a microprocessor, a multi-core processor, a multithreaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5, A9, or similar, processor from Apple® Inc., a Snapdragon™ processor from Qualcomm® Technologies, Inc., or an OMAP™ processor from Texas Instruments, Inc.

The processor 602 may communicate with a system memory 604 over a bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 608 may also couple to the processor 602 via the bus 606. The mass storage 608 may be implemented via any type of non-transitory, machine-readable medium, such as a solid state disk drive (SSDD), a hard drive, an array of hard drives, an optical disk, a thumb drive, and the like. In some examples, the mass storage 608 may be implemented using a micro hard disk drive (HDD), such as in IoT devices. Further, any number of new technologies may be used for the mass storage 608 in addition to, or instead of, the technologies described, such resistance change memories, phase change memories, holographic memories, or chemical memories, among others. For example, the system 600 may incorporate the 3D XPOINT memories from Intel® and Micron®.

The components may communicate over the bus 606. The bus 606 may include any number of technologies, including industry standard architecture (ISA), extended ISA (EISA), peripheral component interconnect (PCI), peripheral component interconnect extended (PCIx), PCI express (PCIe), or any number of other technologies. The bus 606 may be a proprietary bus, for example, used in a SoC based system. Other bus systems may be included, such as an I²C interface, an SPI interface, and point to point interfaces, among others.

The bus 606 may couple the processor 602 to a radio transceiver 610, for communications with the cloud 502 and/or other fog devices 612, including other health monitors, aggregators, gateways, and the like. The radio transceiver 610 may include any number of frequencies and protocols, such as a WLAN unit used to implement Wi-Fi™ communications in accordance with the Institute of Electrical and Electronics Engineers (IEEE) 802.11 standard. In addition, wireless wide area communications, e.g., according to a cellular or other wireless wide area protocol, may be implemented via a WWAN unit. For examples in which the system 600 is an IoT device, the radio transceiver 610 may include a radio for communications at about 2.4 gigahertz (Ghz) under the IEEE 802.15.4 standard, for example, using the Bluetooth® low energy (BTLE) standard, as defined by the Bluetooth® Special Interest Group, or the ZigBee® standard, among others. Any number of other radios, configured for a particular wireless communication protocol, may be included in the radio transceiver 610.

The radio transceiver 610 may include a low power wide area (LPWA) transceiver 613 to communicate with substations 612 over an LPWA link. In this example, the communications may follow the IEEE 802.15.4 and IEEE 802.15.4 g standards, among others. For example, the system 600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies.

The bus 606 may couple the processor 602 to a network interface controller (NIC) 614 that may couple to the cloud 502 over a wired connection. The cloud 502 may also connect to the fog devices 612 through wired or wireless connections.

The bus 606 may couple the processor 602 to a sensor interface 616. The sensor interface 616 may be used to obtain sensor readings from the AC motor, as described in relation to FIGS. 1 and 2. The mass storage 608 may include a health monitoring module 616 to perform the health monitoring functions for electrical equipment such as motors and generators, as described herein.

In examples in which the health monitor 104 is an IoT device, for example, in a fog device, a number of other units may be included. For example, a battery may power the health monitor 104. The battery may be a lithium ion battery, a metal-air battery, such as a zinc-air battery, an aluminum-air battery, a lithium-air battery, and the like. A battery monitor/charger may be included in the system 600 to track the state of charge (SoCh) of the battery. The battery monitor/charger may be used to monitor other parameters of the battery to provide failure predictions, such as the state of health (SoH) and the state of function (SoF) of the battery. The battery monitor/charger may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger may communicate the information on the battery to the processor 602 over the bus 606. The battery monitor/charger may also include an analog-to-digital (ADC) convertor that allows the processor 602 to directly monitor the voltage of the battery, or, with appropriate circuitry, the current flow from the battery.

A power block, or other power supply coupled to a grid, may be coupled with the battery monitor/charger to charge the battery. In some examples, the power block may be replaced with a wireless power receiver to obtain the power wirelessly, for example, through a loop antenna in the system 600. A battery charging circuit, such as an LTC4020 chip from Linear Technologies of Milpitas, Calif., among others, may be included in the battery monitor/charger. The specific charging circuits chosen depend on the size of the battery, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

Figure 7:
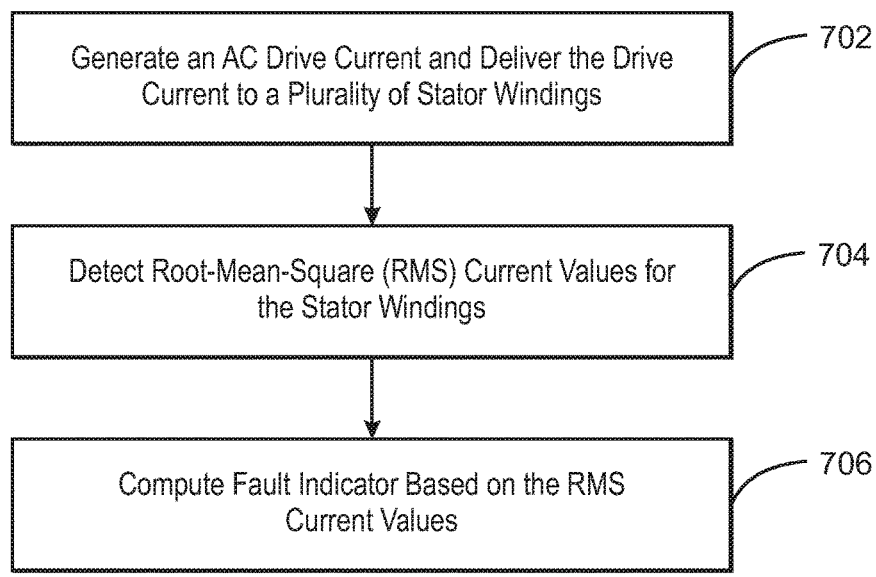
FIG. 7 is a process flow diagram summarizing a method for monitoring the health of an AC motor.

FIG. 7 is a simplified process flow diagram summarizing a method for monitoring the health of an AC motor. The method 700 may be implemented by the health monitor described with respect to FIGS. 1-6. The method may begin at block 702. At block 702, AC drive currents are generated and delivered to a plurality of stator windings of the motor to drive the motor at a specified motor speed. At block 704, RMS current values are received from sensors configured to detect the RMS current on each of the plurality of stator windings. At block 704, the fault indicator is computed based on the RMS current values.

EXAMPLES

Example 1 is an apparatus to monitor the health of a device. The apparatus includes a plurality of sensors to detect root-mean-square (RMS) current values for a plurality of stator windings of the device; and a processor to receive the RMS current values from the plurality of sensors and compute a fault indicator based on the RMS current values, wherein the fault indicator represents a level of current imbalance between the plurality of stator windings due to winding faults.

Example 2 includes the apparatus of example 1, including or excluding optional features. In this example, the device comprises three stator windings and the plurality of sensors comprises three sensors to detect the RMS current values for each of the three stator windings.

Example 3 includes the apparatus of any one of examples 1 to 2, including or excluding optional features. In this example, to compute the fault indicator, the processor is to convert the RMS current values to peak current values and compute the fault indicator based, at least in part, on differences between the peak current values.

Example 4 includes the apparatus of any one of examples 1 to 3, including or excluding optional features. In this example, the device is a motor and the RMS current values are detected periodically at a sampling rate that is lower than the frequency of an AC current driving the motor.

Example 5 includes the apparatus of any one of examples 1 to 4, including or excluding optional features. In this example, to compute the fault indicator, the processor is to convert the RMS current values to peak current values and determine a modified direct current, Id, and a modified quadrature current, Iq.

Example 6 includes the apparatus of any one of examples 1 to 5, including or excluding optional features. In this example, the plurality of stator windings comprises a first stator winding, a second stator winding, and a third stator winding, and the fault indicator, R, is computed according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and wherein I1 rms represents the RMS current sensed for the first stator winding, I2 rms represents the RMS current sensed for the second stator winding, and I3 rms represents the RMS current sensed for the third stator winding.

Example 7 includes the apparatus of any one of examples 1 to 6, including or excluding optional features. In this example, the health of the device is to be displayed as a circle with a radius equal to or proportional to the fault indicator.

Example 8 includes the apparatus of any one of examples 1 to 7, including or excluding optional features. In this example, the health of the device is to be displayed as a rectangular plot of a magnitude of the fault indicator against time.

Example 9 includes the apparatus of any one of examples 1 to 8, including or excluding optional features. In this example, the apparatus is an IoT device configured to wirelessly couple to a communications network.

Example 10 includes the apparatus of any one of examples 1 to 9, including or excluding optional features. In this example, the apparatus is an IoT component of a fog device comprising a plurality of health monitors each monitoring a separate device.

Example 11 is a method of monitoring the health of a motor. The method includes generating AC drive currents and delivering the drive currents to a plurality of stator windings of the motor to drive the motor at a specified motor speed; receiving root-mean-square (RMS) current values from a plurality of sensors, wherein each RMS current value represents an RMS current on each of the plurality of stator windings; and computing a fault indicator based on the RMS current values, wherein the fault indicator represents a level of current imbalance between the plurality of stator windings due to winding faults.

Example 12 includes the method of example 11, including or excluding optional features. In this example, receiving the RMS current values comprises receiving the RMS current values from three sensors to detect the RMS current values for each of three stator windings.

Example 13 includes the method of any one of examples 11 to 12, including or excluding optional features. In this example, computing the fault indicator comprises converting the RMS current values to peak current values and computing the fault indicator based, at least in part, on differences between the peak current values.

Example 14 includes the method of any one of examples 11 to 13, including or excluding optional features. In this example, receiving the RMS current values comprises receiving the RMS current values periodically at a sampling rate that is lower than the frequency of the AC drive current.

Example 15 includes the method of any one of examples 11 to 14, including or excluding optional features. In this example, computing the fault indicator comprises converting the RMS current values to peak current values and determining modified direct current, Id, and modified quadrature current, Iq.

Example 16 includes the method of any one of examples 11 to 15, including or excluding optional features. In this example, the plurality of stator windings comprises a first stator winding, a second stator winding, and a third stator winding, and computing the fault indicator, R, comprises computing the fault indicator according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and wherein I1 rms represents the RMS current sensed for the first stator winding, I2 rms represents the RMS current sensed for the second stator winding, and I3 rms represents the RMS current sensed for the third stator winding.

Example 17 includes the method of any one of examples 11 to 16, including or excluding optional features. In this example, the method includes transmitting the fault indicator to a health monitoring station, wherein the fault indicator is to be displayed at the health monitoring station as a circle with a radius equal to or proportional to the fault indicator.

Example 18 includes the method of any one of examples 11 to 17, including or excluding optional features. In this example, the method includes transmitting the fault indicator to a health monitoring station, wherein the fault indicator is to be displayed at the health monitoring station as a rectangular plot of a magnitude of the fault indicator against time.

Example 19 includes the method of any one of examples 11 to 18, including or excluding optional features. In this example, the method includes wirelessly transmitting the fault indicator to an IoT device.

Example 20 includes the method of any one of examples 11 to 19, including or excluding optional features. In this example, the method includes wirelessly transmitting the fault indicator to an IoT device which is an IoT component of a fog device comprising a plurality of health monitors each monitoring a separate motor.

Example 21 is a tangible, non-transitory, computer-readable medium comprising instructions that, when executed by a processor, direct the processor to operate a health monitor for a device comprising a motor or generator. The computer-readable medium includes instructions that direct the processor to detect root-mean-square (RMS) current values for a plurality of stator windings of the device; and compute a fault indicator based on the RMS current values, wherein the fault indicator represents a level of current imbalance between the plurality of stator windings due to winding faults.

Example 22 includes the computer-readable medium of example 21, including or excluding optional features. In this example, the device comprises three stator windings and the processor is to detect the RMS current values for each of the three stator windings.

Example 23 includes the computer-readable medium of any one of examples 21 to 22, including or excluding optional features. In this example, to compute the fault indicator, the processor is to convert the RMS current values to peak current values and compute the fault indicator based, at least in part, on differences between the peak current values.

Example 24 includes the computer-readable medium of any one of examples 21 to 23, including or excluding optional features. In this example, the device is a motor and the processor is to detect the RMS current values periodically at a sampling rate that is lower than a frequency of an AC current driving the motor.

Example 25 includes the computer-readable medium of any one of examples 21 to 24, including or excluding optional features. In this example, to compute the fault indicator, the processor is to convert the RMS current values to peak current values and determine the modified direct current, Id, and the modified quadrature current Iq.

Example 26 includes the computer-readable medium of any one of examples 21 to 25, including or excluding optional features. In this example, the plurality of stator windings comprises a first stator winding, a second stator winding, and a third stator winding, and the processor is to compute the fault indicator, R, according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and wherein I1 rms represents the RMS current sensed for the first stator winding, I2 rms represents the RMS current sensed for the second stator winding, and I3 rms represents the RMS current sensed for the third stator winding.

Example 27 includes the computer-readable medium of any one of examples 21 to 26, including or excluding optional features. In this example, the health of the device is to be displayed as a circle with a radius equal to or proportional to the fault indicator.

Example 28 includes the computer-readable medium of any one of examples 21 to 27, including or excluding optional features. In this example, health of the device is to be displayed as a rectangular plot of a magnitude of the fault indicator against time.

Example 29 includes the computer-readable medium of any one of examples 21 to 28, including or excluding optional features. In this example, the processor is to configure the health monitor as an IoT device wirelessly coupled to a communications network.

Example 30 includes the computer-readable medium of any one of examples 21 to 29, including or excluding optional features. In this example, the processor is to configure the health monitor as an IoT component of a fog device comprising a plurality of health monitors each monitoring a separate device.

Example 31 is a method of monitoring the health of a generator. The method includes instructions that direct the processor to receiving AC currents generated by a plurality of stator windings of the generator; receiving root-mean-square (RMS) current values from a plurality of sensors, wherein each RMS current value represents an RMS current on each of the plurality of stator windings; and computing a fault indicator based on the RMS current values, wherein the fault indicator represents a level of current imbalance between the plurality of stator windings due to winding faults.

Example 32 includes the method of example 31, including or excluding optional features. In this example, receiving the RMS current values comprises receiving the RMS current values from three sensors to detect the RMS current values for each of three stator windings.

Example 33 includes the method of any one of examples 31 to 32, including or excluding optional features. In this example, computing the fault indicator comprises converting the RMS current values to peak current values and computing the fault indicator based, at least in part, on differences between the peak current values.

Example 34 includes the method of any one of examples 31 to 33, including or excluding optional features. In this example, receiving the RMS current values comprises receiving the RMS current values periodically at a sampling rate that is lower than a frequency of the currents generated by the plurality of stator windings of the generator.

Example 35 includes the method of any one of examples 31 to 34, including or excluding optional features. In this example, computing the fault indicator comprises converting the RMS current values to peak current values and determining modified direct current, Id, and modified quadrature current, Iq.

Example 36 includes the method of any one of examples 31 to 35, including or excluding optional features. In this example, the plurality of stator windings comprises a first stator winding, a second stator winding, and a third stator winding, and computing the fault indicator, R, comprises computing the fault indicator according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and
wherein I1 rms represents the RMS current sensed for the first stator winding, I2 rms represents the RMS current sensed for the second stator winding, and I3 rms represents the RMS current sensed for the third stator winding.

Example 37 includes the method of any one of examples 31 to 36, including or excluding optional features. In this example, the method includes transmitting the fault indicator to a health monitoring station, wherein the fault indicator is to be displayed at the health monitoring station as a circle with a radius equal to or proportional to the fault indicator.

Example 38 includes the method of any one of examples 31 to 37, including or excluding optional features. In this example, the method includes transmitting the fault indicator to a health monitoring station, wherein the fault indicator is to be displayed at the health monitoring station as a rectangular plot of a magnitude of the fault indicator against time.

Example 39 includes the method of any one of examples 31 to 38, including or excluding optional features. In this example, the method includes wirelessly transmitting the fault indicator to an IoT device.

Example 40 includes the method of any one of examples 31 to 39, including or excluding optional features. In this example, the method includes wirelessly transmitting the fault indicator to an IoT device which is an IoT component of a fog device comprising a plurality of health monitors each monitoring a separate generator.

Example 41 is an apparatus for monitoring the health of a device. The apparatus includes instructions that direct the processor to means for sensing root-mean-square (RMS) current values representing an RMS current on each of a plurality of stator windings; and means for computing a fault indicator based on the RMS current values, wherein the fault indicator represents a level of current imbalance between the plurality of stator windings due to winding faults.

Example 42 includes the apparatus of example 41, including or excluding optional features. In this example, the means for sensing comprises three sensors to detect the RMS current values for each of three stator windings.

Example 43 includes the apparatus of any one of examples 41 to 42, including or excluding optional features. In this example, the means for computing converts the RMS current values to peak current values and computes the fault indicator based, at least in part, on differences between the peak current values.

Example 44 includes the apparatus of any one of examples 41 to 43, including or excluding optional features. In this example, the means for sensing senses the RMS current values periodically at a sampling rate that is lower than a frequency of the currents generated by the plurality of stator windings of the device.

Example 45 includes the apparatus of any one of examples 41 to 44, including or excluding optional features. In this example, the means for computing converts the RMS current values to peak current values and determines the modified direct current, Id, and modified quadrature current, Iq.

Example 46 includes the apparatus of any one of examples 41 to 45, including or excluding optional features. In this example, the plurality of stator windings comprises a first stator winding, a second stator winding, and a third stator winding, and the means for computing the fault indicator, R, computes the fault indicator according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and
wherein I1 rms represents the RMS current sensed for the first stator winding, I2 rms represents the RMS current sensed for the second stator winding, and I3 rms represents the RMS current sensed for the third stator winding.

Example 47 includes the apparatus of any one of examples 41 to 46, including or excluding optional features. In this example, the apparatus includes means for transmitting the fault indicator to a health monitoring station, wherein the fault indicator is to be displayed at the health monitoring station as a circle with a radius equal to or proportional to the fault indicator.

Example 48 includes the apparatus of any one of examples 41 to 47, including or excluding optional features. In this example, the apparatus includes means for transmitting the fault indicator to a health monitoring station, wherein the fault indicator is to be displayed at the health monitoring station as a rectangular plot of a magnitude of the fault indicator against time.

Example 49 includes the apparatus of any one of examples 41 to 48, including or excluding optional features. In this example, the apparatus includes means for wirelessly transmitting the fault indicator to an IoT device.

Example 50 includes the apparatus of any one of examples 41 to 49, including or excluding optional features. In this example, the apparatus includes means for wirelessly transmitting the fault indicator to an IoT device which is an IoT component of a fog device comprising a plurality of health monitors each monitoring a separate device.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A device comprising a motor or generator and an apparatus to monitor the health of the device, comprising:
   a plurality of stator windings of the device;
   a plurality of sensors to detect root-mean-square (RMS) current values for each of the plurality of stator windings of the device; and
   a processor to:
   receive the RMS current values from the plurality of sensors;
   convert the RMS current values to peak current values;
   determine a modified direct current, Id, and a modified quadrature current, Iq, based on the peak current values and referencing a phase angle of 120 degrees in place of an actual measured phase angle;
   compute a fault indicator based on the modified direct current, Id, and the modified quadrature current, Iq, wherein the fault indicator represents a level of current imbalance between the plurality of stator windings due to winding faults; and
   transmit the fault indicator to a display device.

2. The apparatus of claim 1, wherein the device comprises three stator windings and the plurality of sensors comprises three sensors to detect the RMS current values for each of the three stator windings.

3. The apparatus of claim 1, wherein the device is a motor and the RMS current values are detected periodically at a sampling rate that is lower than the frequency of an AC current driving the motor.

4. The apparatus of claim 1, wherein the plurality of stator windings comprises a first stator winding, a second stator winding, and a third stator winding, and the fault indicator, R, is computed according to the following formula:

$$R = \sqrt{Id^2 + Iq^2} \text{ wherein:}$$

$$Id = \sqrt{\frac{3}{4}} \, I3peak - \sqrt{\frac{3}{4}} \, I2peak;$$

$$Iq = I1peak - \sqrt{\frac{1}{4}} \, I2peak - \sqrt{\frac{1}{4}} \, I3peak;$$

$$I1_{Peak} = \sqrt{2} * I1rms;$$

$$I2_{Peak} = \sqrt{2} * I2rms;$$

$$I3_{Peak} = \sqrt{2} * I3rms;$$

and
   wherein I1 rms represents the RMS current sensed for the first stator winding, I2 rms represents the RMS current sensed for the second stator winding, and I3 rms represents the RMS current sensed for the third stator winding.

5. The apparatus of claim 1, wherein the health of the device is to be displayed as a circle with a radius equal to or proportional to the fault indicator.

6. The apparatus of claim 1, wherein the health of the device is to be displayed as a rectangular plot of a magnitude of the fault indicator against time.

7. The apparatus of claim 1, wherein the apparatus is an IoT device configured to wirelessly couple to a communications network.

8. The apparatus of claim 1, wherein the apparatus is an IoT component of a fog device comprising a plurality of health monitors each monitoring a separate device.

9. A method of monitoring the health of a motor, comprising:
generating AC drive currents and delivering the drive currents to a plurality of stator windings of the motor to drive the motor at a specified motor speed;
receiving root-mean-square (RMS) current values from a plurality of sensors, wherein each RMS current value represents an RMS current on each of the plurality of stator windings;
converting the RMS current values to peak current values;
determining a modified direct current, Id, and a modified quadrature current, Iq, based on the peak current values and referencing a phase angle of 120 degrees in place of an actual measured phase angle;
computing a fault indicator based on the modified direct current, Id, and the modified quadrature current, Iq, wherein the fault indicator represents a level of current imbalance between the plurality of stator windings due to winding faults; and
transmitting the fault indicator to a display device.

10. The method of claim 9, wherein receiving the RMS current values comprises receiving the RMS current values from three sensors to detect the RMS current values for each of three stator windings.

11. The method of claim 9, wherein receiving the RMS current values comprises receiving the RMS current values periodically at a sampling rate that is lower than the frequency of the AC drive current.

12. The method of claim 9, wherein the plurality of stator windings comprises a first stator winding, a second stator winding, and a third stator winding, and computing the fault indicator, R, comprises computing the fault indicator according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1\text{rms};$$

$$I2_{Peak} = \sqrt{2} * I2\text{rms};$$

$$I3_{Peak} = \sqrt{2} * I3\text{rms};$$

and
wherein I1 rms represents the RMS current sensed for the first stator winding, I2 rms represents the RMS current sensed for the second stator winding, and I3 rms represents the RMS current sensed for the third stator winding.

13. The method of claim 9, comprising transmitting the fault indicator to a health monitoring station, wherein the fault indicator is to be displayed at the health monitoring station as a circle with a radius equal to or proportional to the fault indicator.

14. The method of claim 9, comprising transmitting the fault indicator to a health monitoring station, wherein the fault indicator is to be displayed at the health monitoring station as a rectangular plot of a magnitude of the fault indicator against time.

15. The method of claim 9, comprising wirelessly transmitting the fault indicator to an IoT device.

16. The method of claim 9, comprising wirelessly transmitting the fault indicator to an IoT device which is an IoT component of a fog device comprising a plurality of health monitors each monitoring a separate motor.

17. A tangible, non-transitory, computer-readable medium comprising instructions that, when executed by a processor, direct the processor to operate a health monitor for a device comprising a motor or generator, the instructions to direct the processor to:
detect root-mean-square (RMS) current values for a plurality of stator windings of the device;
convert the RMS current values to peak current values;
determine a modified direct current, Id, and a modified quadrature current, Iq, based on the peak current values and referencing a phase angle of 120 degrees in place of an actual measured phase angle;
compute a fault indicator based on the modified direct current, Id, and the modified quadrature current, Iq, wherein the fault indicator represents a level of current imbalance between the plurality of stator windings due to winding faults; and
transmit the fault indicator to a display device.

18. The computer-readable medium of claim 17, wherein the device is a motor and the processor is to detect the RMS current values periodically at a sampling rate that is lower than a frequency of an AC current driving the motor.

19. The computer-readable medium of claim 17, wherein the plurality of stator windings comprises a first stator winding, a second stator winding, and a third stator winding, and the processor is to compute the fault indicator, R, according to the following formula:

$$R = \sqrt{Id^2 + Iq^2} \text{ wherein:}$$

$$Id = \sqrt{\frac{3}{4}} I3peak - \sqrt{\frac{3}{4}} I2peak;$$

$$Iq = I1peak - \sqrt{\frac{1}{4}} I2peak - \sqrt{\frac{1}{4}} I3peak;$$

$$I1_{Peak} = \sqrt{2} * I1\text{rms};$$

$$I2_{Peak} = \sqrt{2} * I2\text{rms};$$

$$I3_{Peak} = \sqrt{2} * I3\text{rms};$$

and
wherein I1 rms represents the RMS current sensed for the first stator winding, I2 rms represents the RMS current sensed for the second stator winding, and I3 rms represents the RMS current sensed for the third stator winding.

* * * * *